Dec. 5, 1950     W. E. LOONEY     2,533,126
POWER TRANSMISSION DEVICE

Filed March 8, 1945     4 Sheets-Sheet 1

INVENTOR.
WILLIAM E. LOONEY
BY
*Swan, Frye, & Hardesty*
ATTORNEYS

INVENTOR.
WILLIAM E. LOONEY
BY
ATTORNEYS

INVENTOR.
WILLIAM E. LOONEY
BY
ATTORNEYS

Dec. 5, 1950 W. E. LOONEY 2,533,126
POWER TRANSMISSION DEVICE
Filed March 8, 1945 4 Sheets-Sheet 4
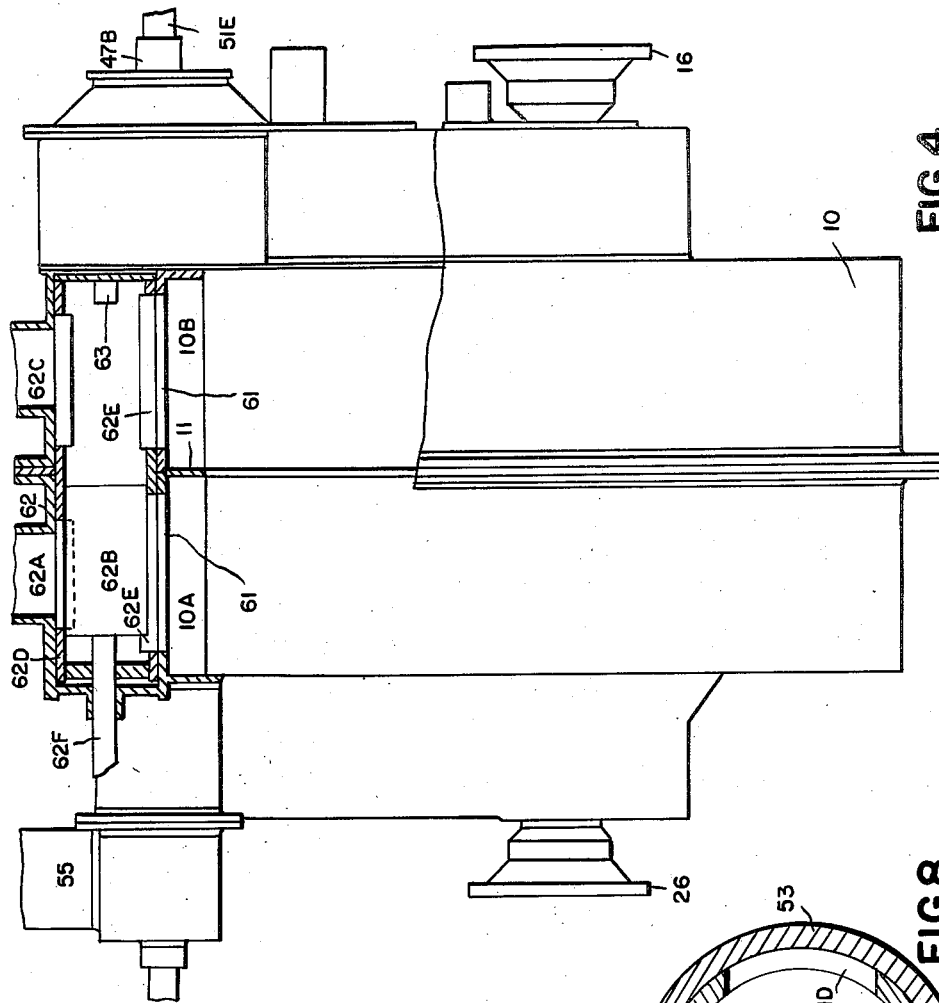
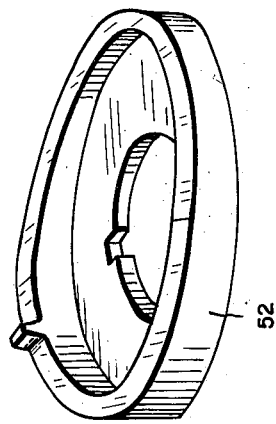
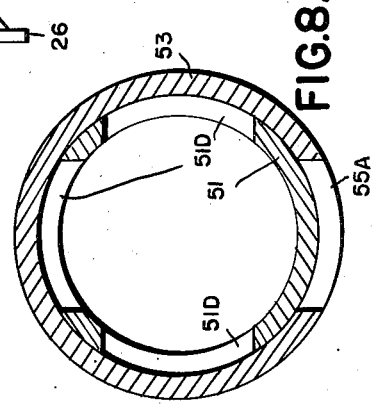
INVENTOR.
WILLIAM E. LOONEY
BY
Swan, Frye, & Hardesty
ATTORNEYS Patented Dec. 5, 1950

2,533,126

UNITED STATES PATENT OFFICE 2,533,126

POWER TRANSMISSION DEVICE

William E. Looney, Detroit, Mich.

Application March 8, 1945, Serial No. 581,572

4 Claims. (Cl. 74—757)

1

The present invention relates to power transmission devices and more particularly to such devices in which the speed of the driven shaft may be varied to provide for torque requirements.

Among the objects of the invention is a variable speed transmission, variable through an infinite number of speeds from a maximum in reverse to a maximum forward speed.

Another object is a variable speed transmission which may be used without usual clutch means.

Still other objects and advantages will be apparent to those skilled in the art upon reference to the following description and the accompanying drawings in which Figure 1 is a vertical central longitudinal section of the preferred form of the transmission.

Figure 4 is an elevational view with parts in section.

Figure 6 is a perspective view of the clutch cam.

Figure 8 is a section on line 8—8 of Figure 2.

Figure 1:
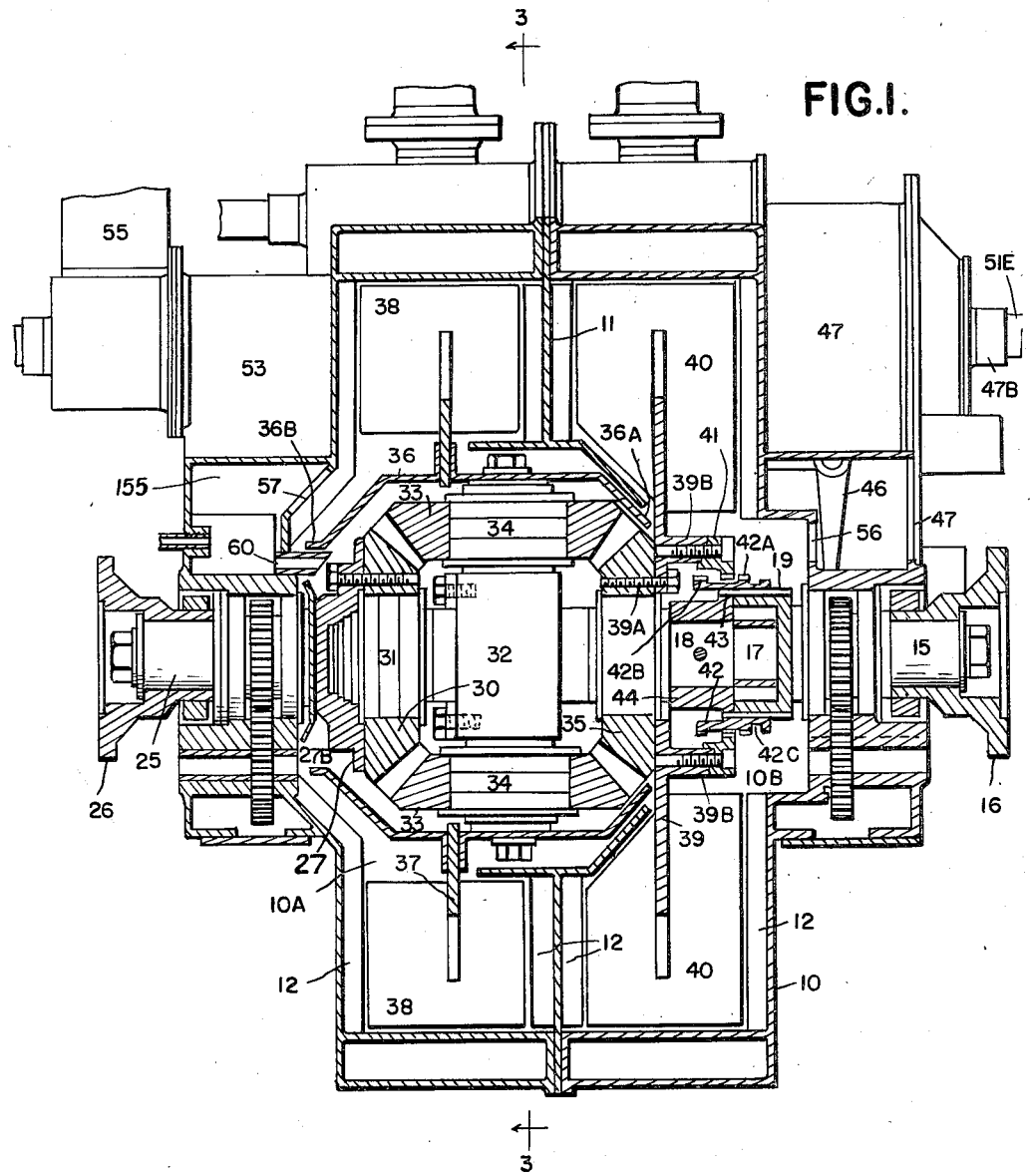

As indicated in the drawings, transmissions embodying the present invention may consist of one or more fluid clutches, in one of which is embodied a differential gearing structure, and means for admitting more or less fluid to the clutch casings and for removing the fluid under certain conditions.

Figure 3:
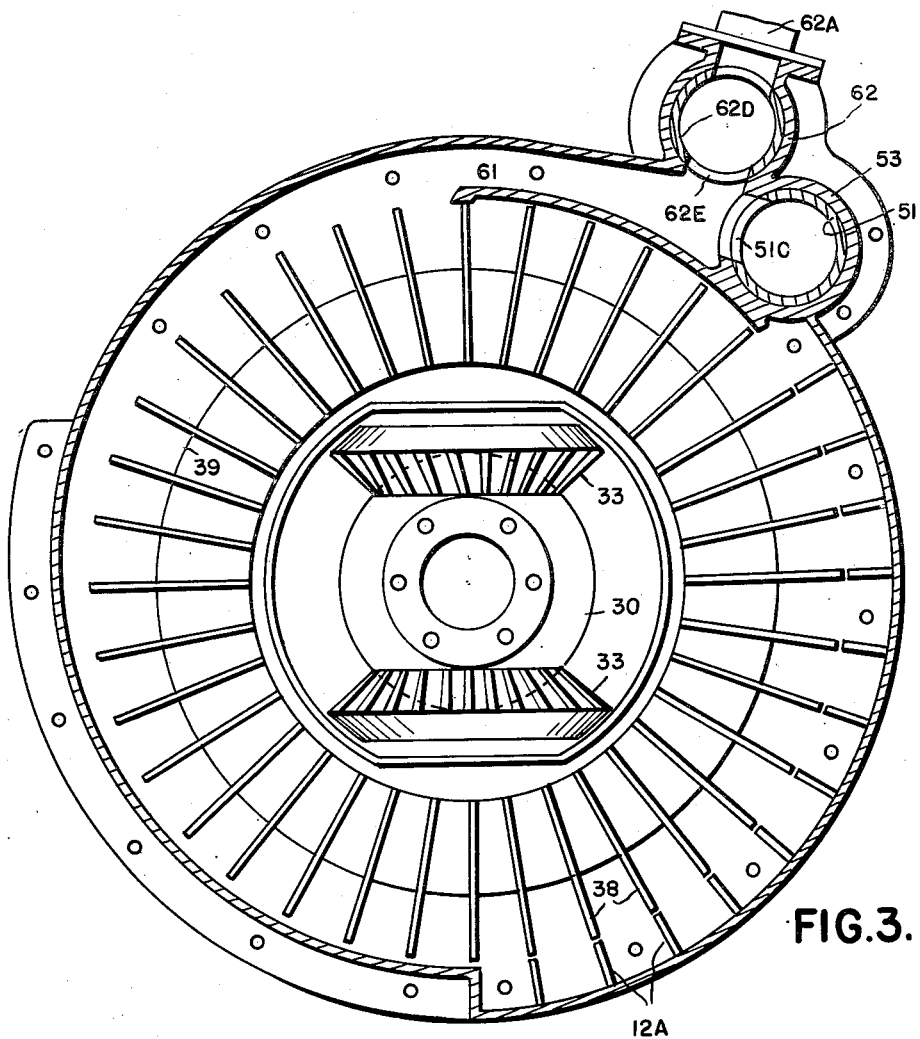
Figure 3 is a section on line 3—3 of Figure 1.

As shown in detail in the drawings, the transmission is constructed in a substantially circular housing 10 divided by a partition 11 into two chambers 10A and 10B each provided around its side walls with stationary inwardly projecting ribs 12 and with inwardly projecting ribs 12A around a portion of the inner periphery of the housing (see Fig. 3).

Mounted in suitable bearings axially of the casing 10 and extending through one end wall thereof, is a stub shaft 15, carrying on its outer end a driving flange 16 and having its inner end of cup form to receive a pilot bearing 17 of a second shaft 18. The cup is also splined as at 19 on its outer periphery.

In the other end of housing 10 is axially mounted in suitable bearings a second stub shaft 25 provided at its outer end with a driven flange 26, and at its inner end with a flange 27 to which is secured the bevel gear 30, the latter being bored centrally to receive the pilot bearing 31 for the other end of the second shaft 18.

This shaft 18 carries fixed to it a cross shaft or block 32 having diametrically opposite trunions carrying bevel gears 33 on suitable antifriction bearings 34 in position to mesh with bevel gear 30, while a fourth gear 35 is rotatably mounted on shaft 18 and meshes with the gears 33.

Fixed to the outer ends of cross shaft 32 is an oil shield 36 extending over the gearing 30—33—35 and fixed to the shield 36 is a spider

2

37 carrying a plurality of clutch vanes 38, located in housing chamber 10A.

A second spider 39 is fixed as by screws 39A to gear 35 and carries vanes 40 located in chamber 10B of the housing. This spider 39 is provided with bosses 39B circularly arranged and to these is secured a clutch ring 41—an internally toothed or splined ring adapted to coact with the external teeth or splines of ring 42. This latter—ring 42—is provided with two rows of external teeth 42A and 42B, or splines spaced as shown, and with internal teeth or splines meshing with the splines 19 on shaft 15, and adapted to mesh with teeth or splines 43 on a collar 44 fixed to shaft 18.

The ring 42 is slidable longitudinally of the shafts by means of a slip ring 45A in the groove 42C carried on a plunger 45 (see Fig. 2) itself slidable through the action of a lever 46.

The ring 42 has its internal and external teeth so arranged that in one position, it meshes with splines 19 and ring 41 leaving collar 44 free. In its intermediate position, it is free from ring 41 but is meshed with splines 19 and ring 44. In its third position, it meshes with splines 19 and those on collar 44 while the teeth 42A mesh with those on ring 41.

The lever 46 is mounted in a small housing extension 47 and acts against a suitable spring 48 tending to move the plunger 46 and ring 42 toward the right (Figs. 1 and 2) and therefore into the first position—connecting shaft 15 with ring 41.

At the upper end of casing 47 is located a valve assembly consisting of an outer stationary tube 50 provided with an opening 50A opening into the casing 47 and an inner tube 51 also provided with an opening 51A adapted to register with opening 50A when the tube 51 is rotated. The stationary tube 50 is fixed to or integral with the casing cover 47A which is provided with an axially bored boss 47B in alignment with tube portion 50.

Also located within casing 47 is a cam member 52 fixed to and rotatable with tube 51 and adapted to actuate lever 46.

The tube 50 is in alignment with an extension 53 carried by housing 10 and extending the length of the latter, and for a short distance beyond, while the tube 51 extends from the cover 47A to the other end of housing 10 and is rotatable by means of the shaft 51E extending through cover 47A and fixed to the closed end of the tube.

The open end of tube 51 abuts a short tube 54 independently rotatable by means of a shaft 54A extending to the outside. The tube 54 is provided with an opening 54B adapted to register with a conduit 55 leading to a suitable fluid reservoir (not shown). This tube or valve 54 is used only as a means of supplying fluid and of controlling access of fluid to the transmission.

The oil or fluid from chamber 155 flowing through opening 57 into chamber 10A enters the latter above the oil shield 36, and means is provided for admitting some of the oil to within the shield so as to lubricate the gearing 30—33—35. This means is shown as a small tube or pipe 60 leading from chamber 155 beyond the edge of the shield 36. Excess oil will flow over the edge of the shield and into chamber 10B, since the lip or edge 36A is somewhat farther from the axis of rotation than edge 36B.

In the operation of the transmission, at the time of engine starting, the parts are in such position that no drive will be transmitted from shaft 15 to shaft 25. This means that the lever 46 is resting on the cam 52 at the point N (Fig. 7), and that port 50A is closed as is the port 54B with no fluid in either clutch housing. The vanes 38 and 40 are free to turn and, therefore, the gears 33 and 35 rotate freely, the gear 30 being of course stationary.

Figure 7:
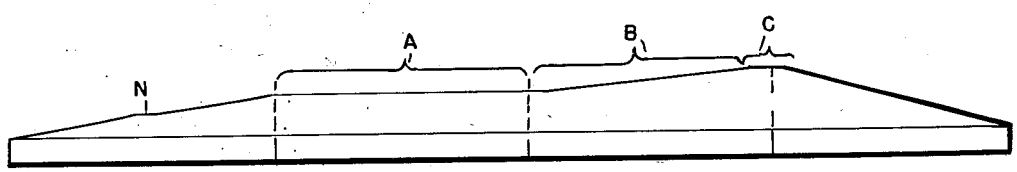
Figure 7 is a development of the cam form of the latter.

When the tube 51 is rotated by the operator to open port 50A, the port opening to chamber 155 is closed, the port 51B remains closed, and port 51C is opened. At the same time, the cam 52 is rotated to move the follower on lever 46 from the N position to the A position (Fig. 7). With the parts in this position, the clutch ring 42 connects shaft 15 to shaft 18 and the passageway for oil is open to chamber 10B through casing 47 and openings 56 but closed to chamber 10A.

The valve 54B is then opened by the operator and the resistance to rotation of vanes 40 in 10B builds up until it overcomes the resistance of the driven shaft 25. This build-up of resistance in chamber 10B provides the equivalent of a variation in driving ratio of from the greatest possible ratio down to a ratio approximating 1 to 2. With the least amount of oil in chamber 10B necessary to overcome the resistance on shaft 25, a maximum ratio is obtained. With the greatest resistance possible in chamber 10B, the smallest ratio obtains.

While the lever 46 is on the flat A of the cam, the ring 42 is in its intermediate position in which it connects shaft 15 and collar 44 (and therefore shaft 18), so that drive is transmitted from shaft 15 to shaft 18 to member 32, rolling the gears 33 around on gear 35 which is gradually slowing down. This action causes the gear 30 to move in the same direction as shaft 15 and from no movement thereof to a speed of substantially twice that of shaft 15. At the same time, port 51C communicating with chamber 10A and vanes 38 has been opened by the operator, so that any fluid flowing into this chamber is immediately pumped out, through port 51C to valve 51 and flows through port 51A and chamber in casing 47 into chamber 10B.

When the valve 51 and cam 52 are further rotated so as to move lever 46 up the cam slope B to the short flat C, the ring 42 is moved as far to the left (Fig. 1) as possible and the shafts 15 and 18 are locked together with ring 41, vanes 40 and 38, so that there is a direct drive through from shaft 15 to shaft 25. However, in moving the cam, the valve 51 has been moved to close the ports by which fluid enters chambers 10A and 10B and the outlet ports 62E from these have been opened so that there is no fluid in either chamber.

Figure 2:
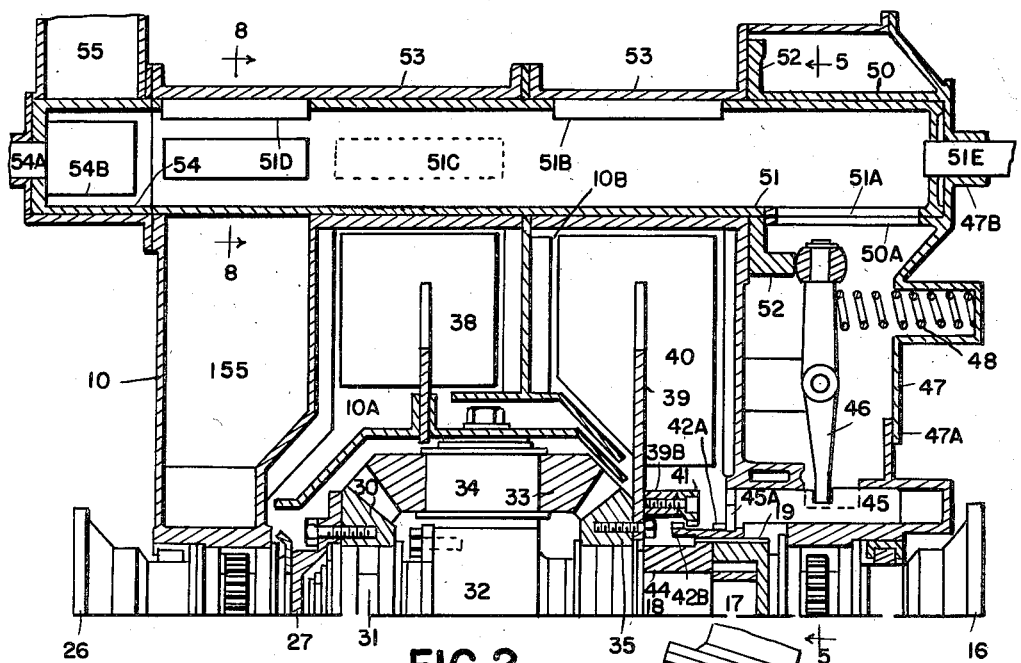
Figure 2 is a longitudinal half section on the line 2—2 of Figure 5.
Figure 5:
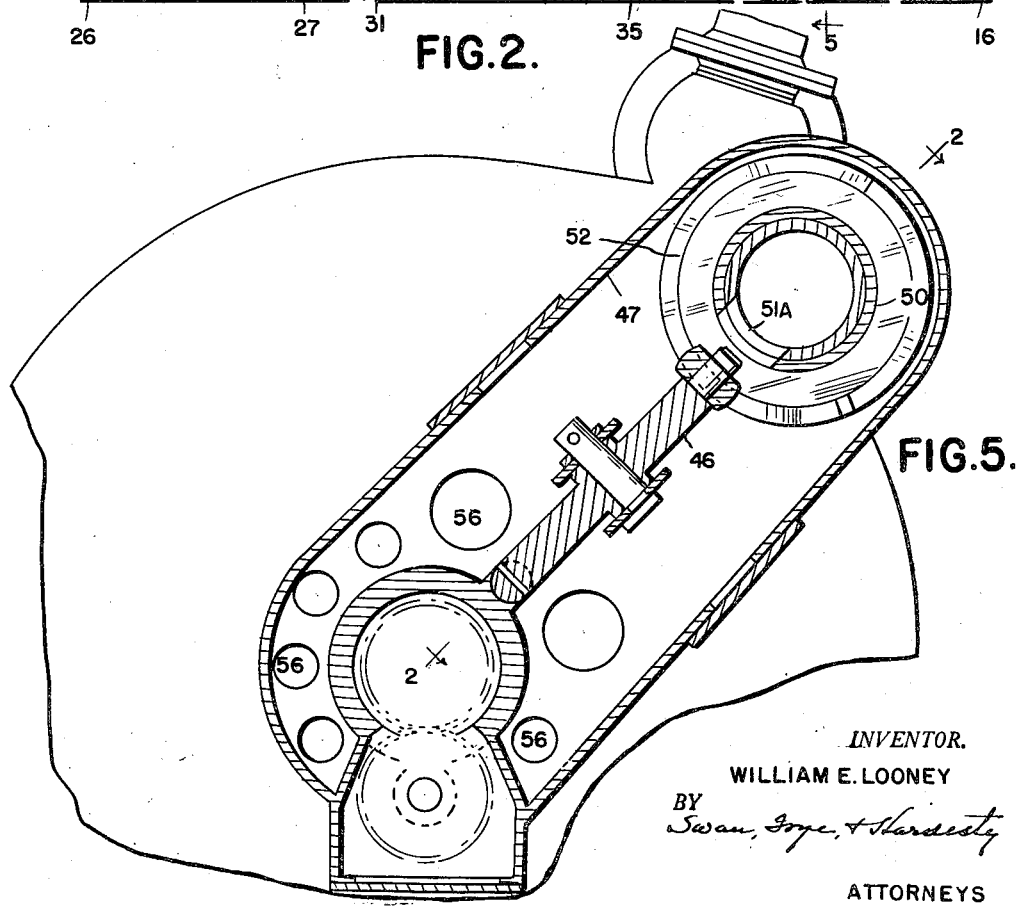
Figure 5 is a section on line 5—5 of Figure 2.

Reference to Fig. 8 shows that the valve 51 at the point opposite chamber 155 is provided with three ports 51D so that only when the valve is in the position of Fig. 2, is fluid prevented from entering chamber 10A. With this arrangement, fluid may be permitted to flow into chamber 10A during direct drive to act as a brake if desired. The control of such inflow is exercised by valve 54.

The reverse drive of the shaft 25 is accomplished by moving the lever 46 to the low portion of the cam to the left of N in Fig. 7. In this operation, no fluid is admitted to chamber 10B, but fluid is supplied to and retained in chamber 10A, port 51C being closed when the ring 42 is moved to the right (Fig. 1) so that shaft 15 is connected to ring 41 and shaft 18 disconnected from shaft 15. The drive is then from shaft 15 to gear 35 and, since shaft 18 is retarded or held, to gear 30 in the reverse direction through pinions 33.

The valve casing 62 into which the outlets 61 for the two chambers 10A and 10B both discharge is provided with an automatic longitudinally movable valve plunger 62B adapted to prevent transfer of fluid between the chambers. When fluid is being pumped out of chamber 10B for example, the valve 62B is moved to the position shown in Fig. 4 and closes the port into chamber 10A as well as conduit 62A and at the same time, opens conduit 62C. If fluid is being pumped out of chamber 10A, the valve 62B will move over against stop 63, closing off chamber 10B and outlet 62C while opening outlet 62A.

Within the casing 62 is a rotatable sleeve valve 62D controlling the passage of oil from the chambers 10A and 10B and rotatable by means of a suitable handle (not shown) attached to the shaft 62F. The inner end of the shaft projects into the valve chamber and acts to limit the movement of valve 62B in the same manner as the stop 63.

As an example of the operation of the device, assuming its use in a motor vehicle and with the driving motor attached to flange 16, it is to be presumed that substantially no fluid is in the transmission and that, therefore, the several movable parts are free to move. In this condition, the motor may be started and no drive will be transmitted to driven flange 26.

With the motor running, and for forward motion, the valve 51 will be rotated to the position of Fig. 2, thereby transmitting rotative movement to spider 32 through connections 19, 42, 43. Both sets of vanes 38 and 40 are then turning. The valve 54 is then opened, allowing fluid to flow into valve 51 and thence to vanes 40 in chamber 10B, and the resistance to the movement of gear 35 builds up the torque on gear 30 to and beyond the resistance offered by the latter.

In the meantime, the valve 62D being closed, any fluid which was in or has gotten in chamber 10A is pumped out of the latter into valve 51 and passes along to port 51A and then into chamber 10B. The amount of fluid entering chamber 10B is controlled by the manipulation of valve 54 and the amount retained in the chamber may be regulated by manipulation of valve 62D. For example, assuming a condition wherein the load resistance at 26 has increased sufficiently to bring down the motor speed to a point of low power delivery, it then becomes desirable to increase the apparent ratio and permit the motor to increase its speed. This is accomplished by opening valve 62D and allowing some of the fluid to be pumped out of chamber 10B, so that the vanes 40 have less resistance. Accurate control of motor speeds is therefore readily accomplished by manipulation of valves 54 and 64D.

While the present device is primarily a driving means, it may also be used for braking purposes. When, for example, the parts are in direct drive position, admission of fluid to either chamber 10A and 10B will result in a braking effect. Likewise when the parts are in overdrive position that is, shaft 15 connected to shaft 18 and gear 35 free to rotate, admission of fluid to chamber 10A will result in braking.

While the above description is made under the assumption that flange 16 is at the driving end and flange 26 at the load end of the transmission, and while this is the preferred arrangement for most purposes, it should be noted that this arrangement may be reversed and the driving torque applied to flange 26 with the load on flange 16 without substantial change in the structure, or the operation of the several elements. Such an arrangement would, however, provide only a theoretical high ratio of 2 to 1.

Further, while two chambers 10A and 10B with their enclosed vanes are shown, it is contemplated that a device consisting essentially of only chamber 10A and its appurtenant parts will be constructed for use particularly for airplane use. Such a device could be made to rotate the propeller in a direction opposite to that of the engine and thereby produce a counteracting torque effect. Further, the proper regulation of the inflow of fluid would simulate the action of a variable pitch propeller by varying the speed ratio between the propeller and engine and also cushion shocks to propeller or engine.

I claim:

1. A power transmission device consisting of a housing, a driving shaft extending into one end of said housing, a driven shaft extending from the other end of said housing and coaxial with said driving shaft, an intermediate shaft in axial alignment with said driving and driven shafts, a bevel gear fixed to said driven shaft, a second bevel gear rotatably carried on said intermediate shaft and arranged in face to face relation with the first gear, a spider fixed to said intermediate shaft between said gears and carrying a plurality of bevel gears meshing with the two first mentioned gears, means for retarding the movement of said second gear, said retarding means consisting of an encompassing internally radially ribbed chamber in said housing for said second gear, a spider fixed to said gear and carrying radially arranged vanes the edges of which are arranged to pass the ribs of said chamber with only small clearance and means for introducing oil into said chamber and clutch means for connecting the driving shaft with said intermediate shaft.

2. A power transmission device consisting of a housing, a driving shaft extending into one end of said housing, a driving shaft extending from the other end of said housing and coaxial with said driving shaft, an intermediate shaft in axial alignment with said driving and driven shafts, a bevel gear fixed to said driven shaft, a second bevel gear rotatably carried on said intermediate shaft and arranged in face to face relation with the first gear, a spider fixed to said intermediate shaft between said gears and carrying a plurality of bevel gears meshing with the two first mentioned gears, means for coupling in driving relation said driving shaft and said second gear and means for retarding the rotation of said intermediate shaft and spider, said retarding means consisting of an encompassing internally radially ribbed chamber in said housing for said spider, radially arranged vanes on said spider, said vanes having their edges arranged to pass said ribs with small clearance and means for introducing oil into said chamber.

3. A power transmission device consisting of a housing, a driving shaft extending into one end of said housing, a driven shaft extending from the other end of said housing and coaxial with said driving shaft, an intermediate shaft in axial alignment with said driving and driven shafts, a bevel gear fixed to said driven shaft, a second bevel gear rotatably carried on said intermediate shaft and arranged in face to face relation with the first gear, a spider fixed to said intermediate shaft between said gears and carrying a plurality of bevel gears meshing with the two first mentioned gears, and selective means to couple in driving relation said driving shaft and either said intermediate shaft or said second gear, a partition dividing said housing into two chambers each provided with internal radially arranged ribs, one of said chambers encompassing said spider and the other said second gear, said spider and said second gear each carrying radially arranged vanes adapted to cooperate with its respective adjacent ribs to produce a fluid brake upon the introduction of oil into its chamber, means to introduce oil into said spider encompassing chamber when said drive shaft and second gear are coupled, and means to introduce oil into said gear encompassing chamber when said drive shaft and said intermediate shaft are coupled.

4. A power transmission device consisting of a housing, a driving shaft extending into one end of said housing, a driven shaft extending from the other end of said housing and coaxial with said driving shaft, an intermediate shaft in axial alignment with said driving and driven shafts, a bevel gear fixed to said driven shaft, a second bevel gear rotatably carried on said intermediate shaft and arranged in face to face relation with the first gear, a spider fixed to said intermediate shaft between said gears and carrying a plurality of bevel gears meshing with the two first mentioned gears, and selective means to couple in driving relation said driving shaft and either said intermediate shaft or said second gear, a partition dividing said housing into two chambers each provded with internal radially arranged ribs, one of said chambers encompassing said spider and the other, the said second gear, said spider and said second gear each carrying radially arranged vanes adapted to cooperate with its respective adjacent ribs to produce a fluid brake upon the introduction of oil into its chamber, means to introduce oil into said spider encompassing chamber when said drive shaft and second gear are coupled, means to introduce oil into said gear encompassing chamber when said drive shaft and said intermediate shaft are coupled, and means for removing oil from one of said chambers when oil is introduced into the other.

WILLIAM E. LOONEY.

REFERENCES CITED

The following references are of record in the file of this patent:

UNITED STATES PATENTS

| Number | Name | Date |
|---|---|---|
| 981,298 | Menzies et al. | Jan. 10, 1911 |
| 1,918,163 | Wohlenhaus | July 11, 1933 |
| 2,013,216 | Bonn | Sept. 3, 1935 |
| 2,212,774 | Guyer | Aug. 27, 1940 |
| 2,341,989 | Horstmann | Feb. 15, 1944 |
| 2,368,437 | Alexandresco | Jan. 30, 1945 |

FOREIGN PATENTS

| Number | Country | Date |
|---|---|---|
| 13,488 | Great Britain | June 8, 1912 |
| 84,716 | Switzerland | June 24, 1919 |